(No Model.) 6 Sheets—Sheet 1.

T. W. CAPEN.
HOISTING APPARATUS.

No. 273,462. Patented Mar. 6, 1883.

WITNESSES
Wm A. Skinkle
Edwin A. Newman

INVENTOR
Thomas W. Capen
By his Attorneys,
Baldwin, Hopkins, & Peyton (No Model.)  
6 Sheets—Sheet 2.
T. W. CAPEN.
HOISTING APPARATUS.
No. 273,462. Patented Mar. 6, 1883.
Fig. 2.
Fig. 3.
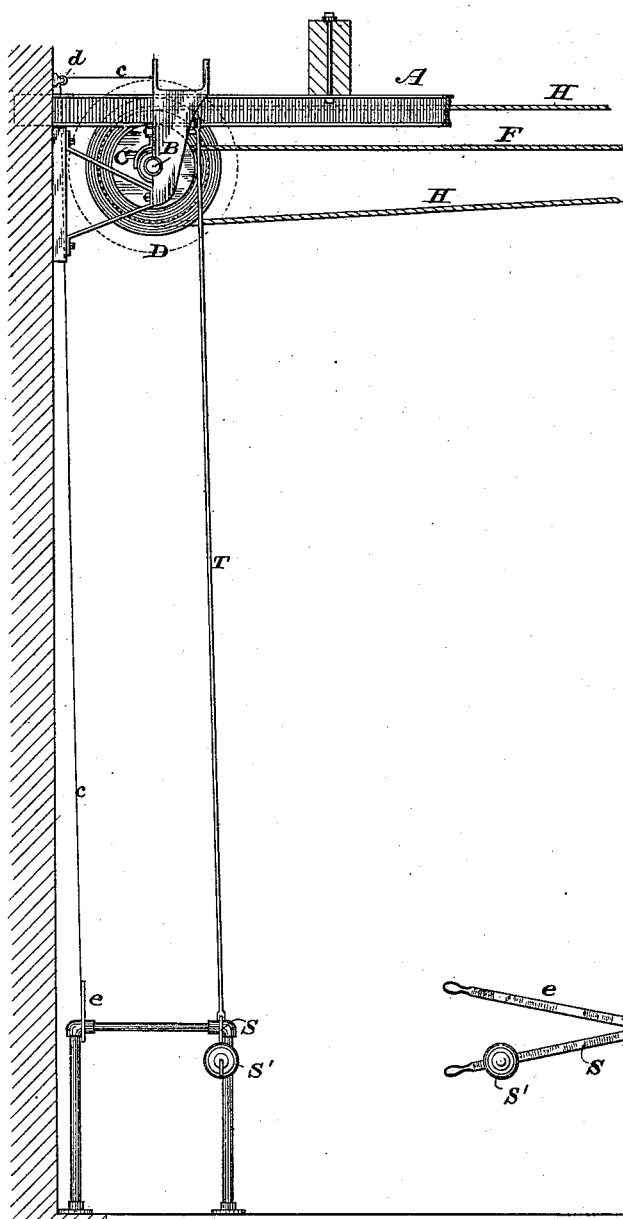
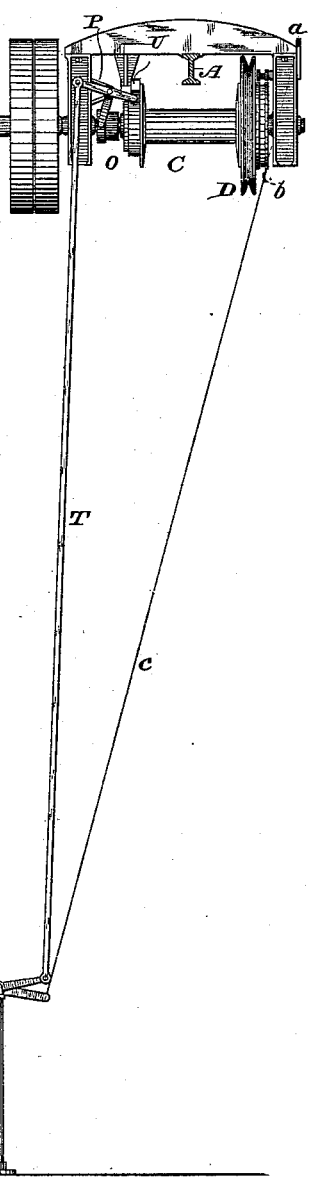
WITNESSES  
Wm. A. Skinkle.  
Edwin A. Newman.
INVENTOR  
Thomas W. Capen.  
By his Attorneys,  
Baldwin, Hopkins, & Peyton.

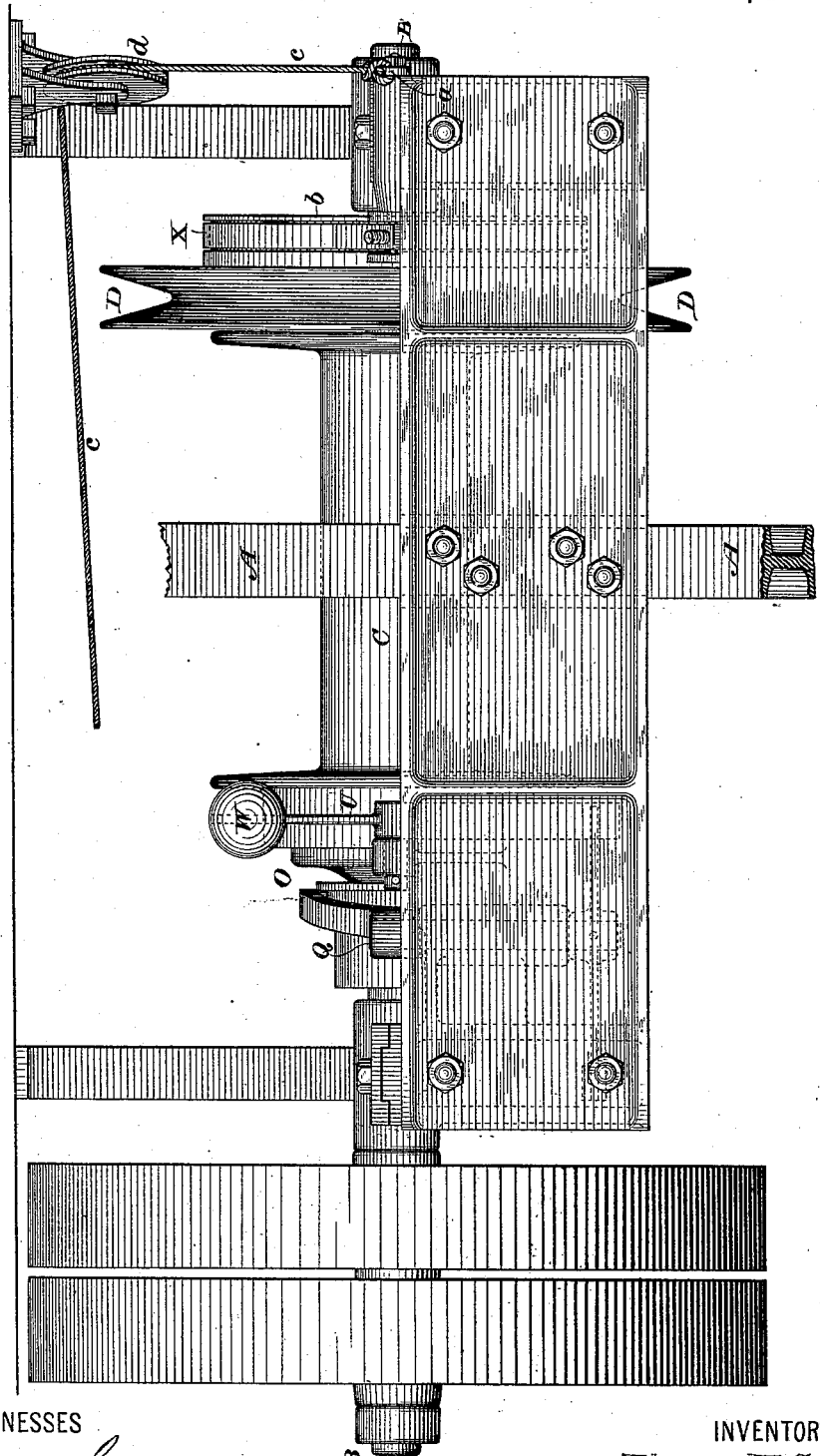

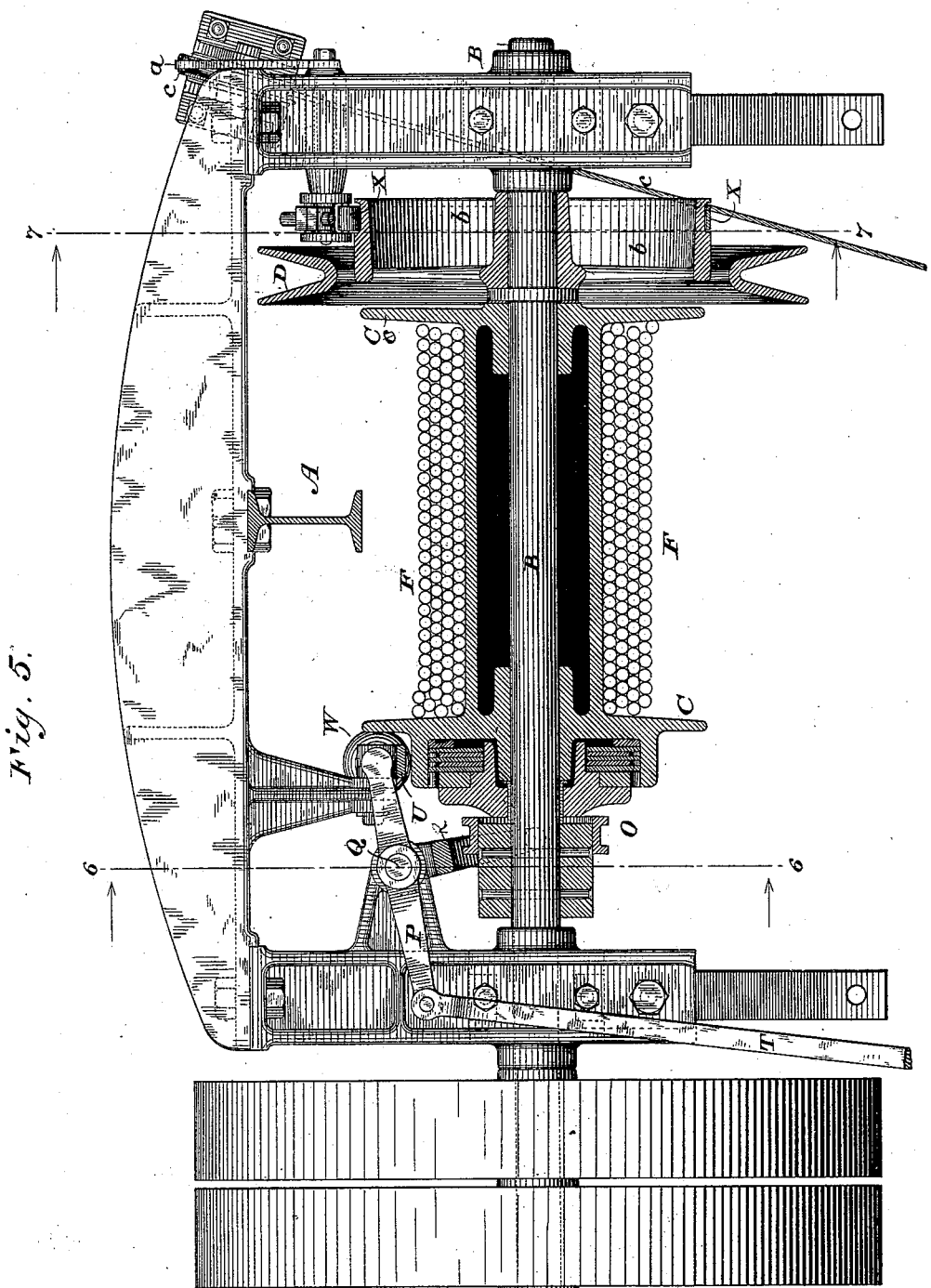

(No Model.) 6 Sheets—Sheet 5.
T. W. CAPEN.
HOISTING APPARATUS.
No. 273,462. Patented Mar. 6, 1883.
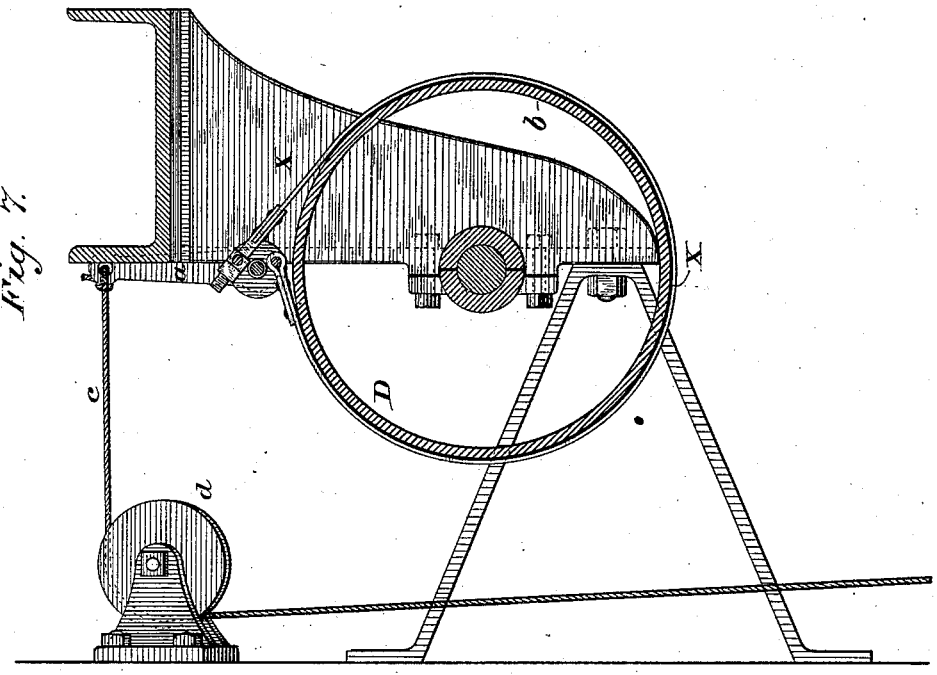
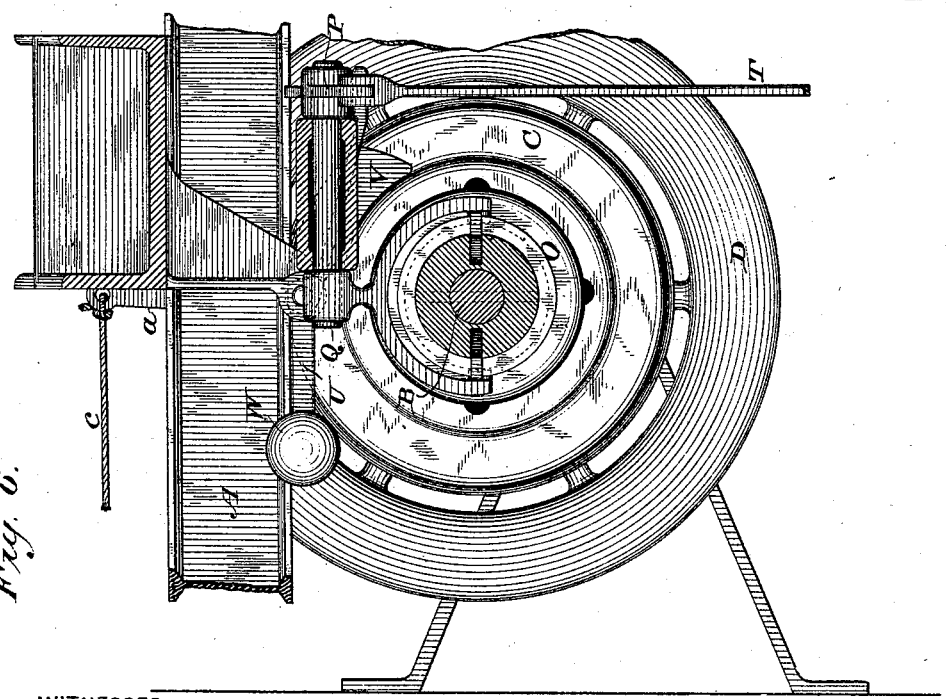
WITNESSES
Wm A. Skinkle
Edwin A. Newman
INVENTOR
Thomas W. Capen
By his Attorneys
Baldwin, Hopkins, & Peyton (No Model.) 6 Sheets—Sheet 6.

T. W. CAPEN.
HOISTING APPARATUS.

No. 273,462. Patented Mar. 6, 1883.

WITNESSES
Wm A. Skinkle
Edwin A. Neuman

INVENTOR
Thomas W. Capen
By his Attorneys
Baldwin, Hopkins, & Peyton

UNITED STATES PATENT OFFICE.

THOMAS W. CAPEN, OF STAMFORD, CONNECTICUT, ASSIGNOR TO THE YALE LOCK MANUFACTURING COMPANY, OF SAME PLACE.

HOISTING APPARATUS.

SPECIFICATION forming part of Letters Patent No. 273,462, dated March 6, 1883.

Application filed January 12, 1883. (No model.)

*To all whom it may concern:*

Be it known that I, THOMAS W. CAPEN, of Stamford, in the county of Fairfield and State of Connecticut, have invented certain new and useful Improvements in Hoisting Apparatus, of which the following, taken in connection with the accompanying drawings, is a specification.

The object of my invention is to provide a hoist for rapid handling of heavy loads which have to be lifted and moved considerable distances. The chief thing I seek to make provision for, therefore, is swift, safe, and economical handling of heavy bodies—like bales of cotton, for example.

Figure 1:
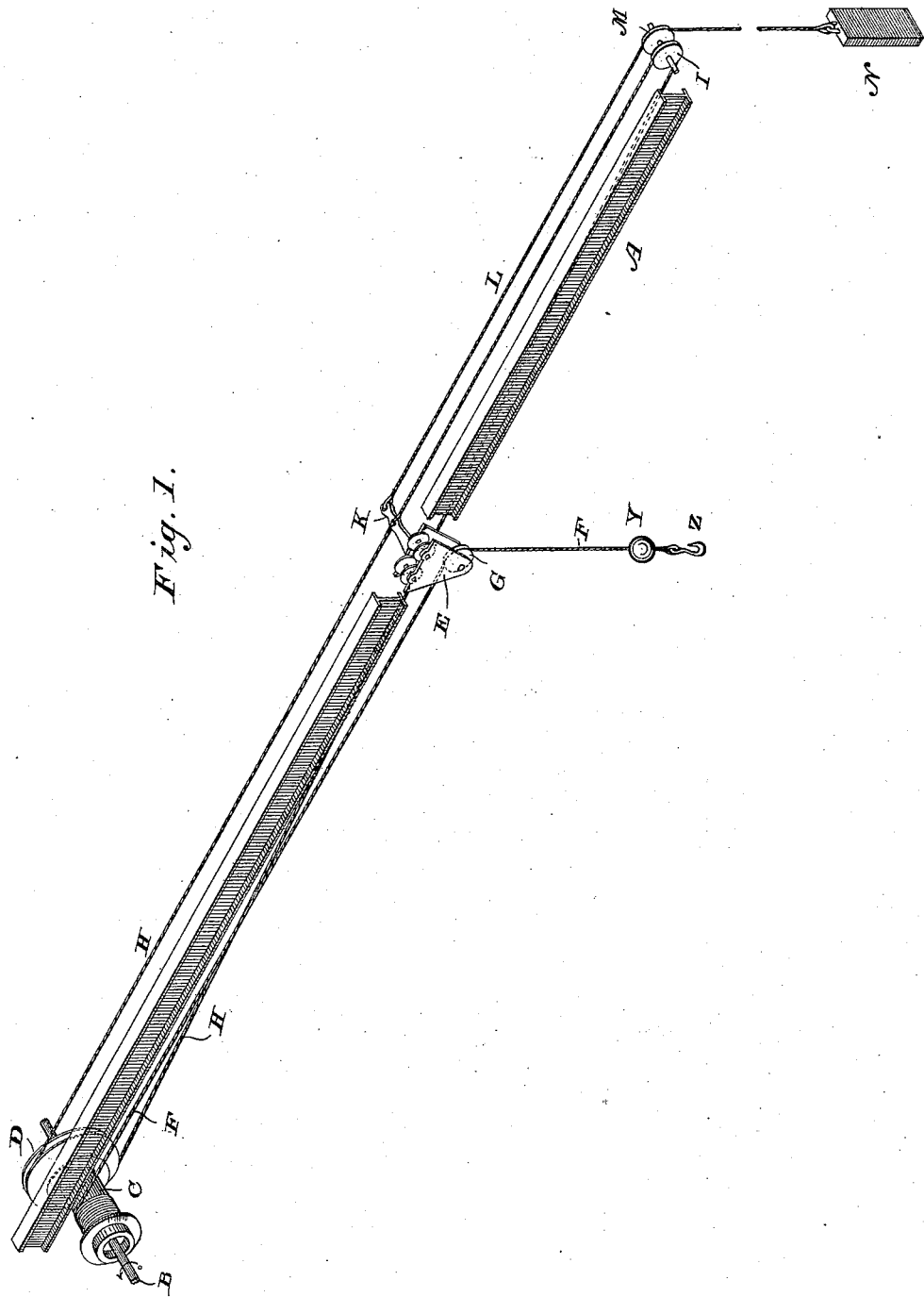
Figure 8:
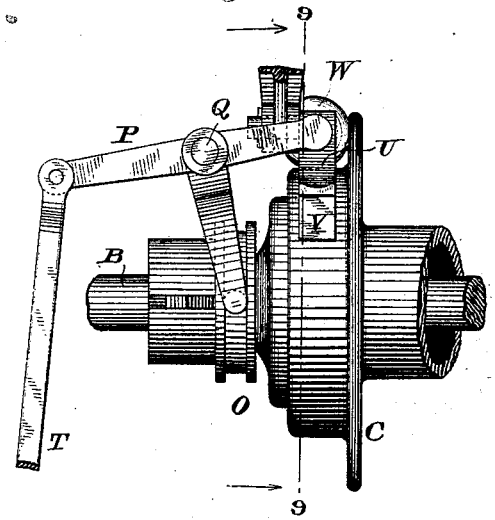
Figure 9:
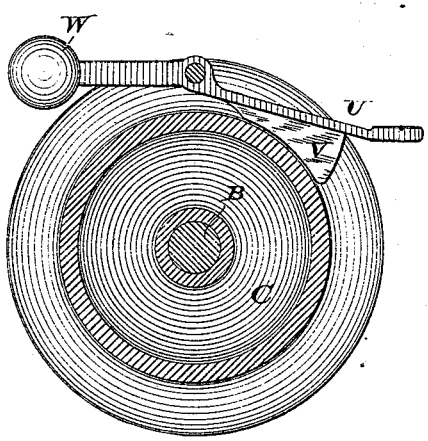
Figure 10:
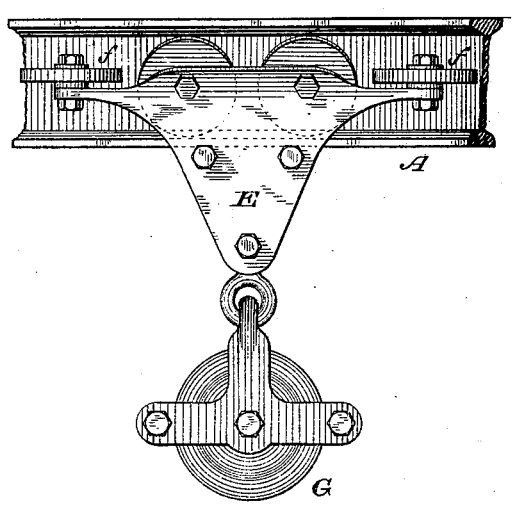
Figure 11:
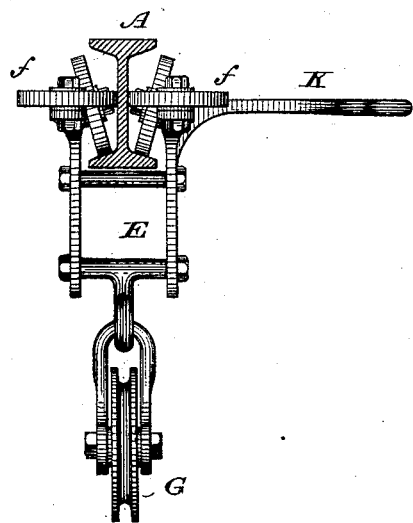

In the accompanying drawings, illustrating my invention, Figure 1 is a diagrammatic perspective view of my apparatus. Fig. 2 is an end elevation of the hoisting and power mechanism and its controlling-levers. Fig. 3 is a side elevation of the same. Fig. 4 is a plan view of the hoisting and power mechanism on an enlarged scale. Fig. 5 is a view of the same, partly in elevation and partly in central longitudinal section. Fig. 6 is a vertical transverse section of the same on the line 6 6 of Fig. 5. Fig. 7 is a similar section on the line 7 7 of Fig. 5. Fig. 8 is a detached view of one end of the hoisting-drum, showing the shifting-levers and brake-shoes. Fig. 9 is a section of the same on the line 9 9 of Fig. 8. Fig. 10 is a side elevation of the trolley, and Fig. 11 is an end elevation of the same.

Referring to the parts by letter, (see Fig. 1,) A indicates an I-beam, which may be bolted to the roof or frame-work of a building or otherwise suitably supported. At one end of this I-beam is a driving-shaft, B, which may be continually revolved in the usual way. On this shaft run loosely, at proper intervals, a drum, C, and a grip-wheel, D. A trolley, E, runs upon the lower flanges of the I-beam, and has connected with it three ropes or cables, to wit: first, the hoisting-rope F, connected with the drum and passing over a sheave, G, in the trolley-frame, and having attached to its pendent end a ball or weight, Y, and a hook, Z; second, a rope, H, passing over and within the V-shaped groove of the grip-wheel, and over a sheave, I, at the opposite end of the I-beam, with its ends secured to an arm, K, projecting from the trolley-frame, making practically an endless band; third, a rope, L, connected at one end to the arm of the trolley-frame, passing over a sheave, M, and provided with a weight, N. All this mechanism is well illustrated in outline in the diagrammatic view, Fig. 1. It is designed to pick up, by means of the hoisting-hook Z, or the like, a heavy load at one end of the I-beam, or at any point near or under the beam, hoist it quickly by the rapid winding up of the hoisting-cable on the drum, then transport it swiftly toward or about to the end of the I-beam, where the drum is located, and there drop it. This is done by means of several appropriate instrumentalities which enable a single operator working suitable hand-levers to control the entire apparatus, and hoist, transport, and deliver heavy loads at any point within the reach or field of the machine.

I provide a clutch mechanism, O, of any suitable character, preferably Weston's friction-disks with Capen's clutch mechanism, for connecting the drum rigidly to the driving-shaft. (See particularly Figs. 3, 5, 8, and 9.) This clutch mechanism is worked immediately by the lever P, pivoted at Q, and provided with a projecting shipper-arm, R, which serves to slide the clutch mechanism to and fro upon the shaft and clutch the drum and shaft together or release them at will, as is well understood. The lever P is operated by a weighted hand-lever, S, with which it is connected by a link or rod, T. The weight S' on the hand-lever is a counter-balance, tending to keep the drum and driving-shaft normally disengaged, but is not sufficiently heavy to automatically apply the drum-brake. In addition to this means of shipping the clutch mechanism and connecting and disconnecting the drum and shaft, I provide a pivoted brake, U, at the free end of the lever P, which may be brought down by that end of the lever in contact with an annular bearing-surface, V, which is a part of the drum, whenever the clutch mechanism is shifted so as to disengage the shaft and drum and the hand-lever S is lowered sufficiently for the purpose. The result is that the drum may be disconnected from the driving-shaft and the drum-brake applied almost simultaneously.

I provide a counterbalance-weight, W, Fig.

9, upon one end of the pivoted brake U, which serves to disconnect the brake from contact with its bearing-surface whenever the pressure of the free end of the lever P is removed. Thus the drum stands normally disconnected from the shaft and the drum-brake idle or in the neutral position, except when the operator lifts the lever S.

I also provide a brake mechanism of any suitable character; but preferably such as illustrated in connection with the grip-wheel D. The object of this mechanism is to enable the operator to hold the grip-wheel firmly against revolution at any time he may desire to do so. As illustrated, the brake mechanism consists (see Figs. 2, 3, 5, 7) of a metallic strap, X, secured at its opposite ends to a pivoted lever, a, at points opposite the pivot, and clasping around an annular projection, b, of the grip-wheel. The lever a is connected, by means of a rope, c, passing over a sheave, d, to a hand-lever, e.

I provide for the trolley (see Figs. 10 and 11) inclined traction or supporting wheels, (which, however, I do not claim in this application,) and in connection with them horizontal guide or steady wheels f, which bear against the opposite sides of the central web of the I-beam, and serve as anti-frictional bearings to keep the trolley from wabbling, and always in its true position with reference to the I-beam.

From the foregoing description of appliances for operating the apparatus, as outlined diagrammatically in Fig. 1, it will be obvious that an operator working the hand-lever S will be able to cause the rotation of the drum in the direction for hoisting, or to permit it in the direction for lowering, or to prevent its motion altogether at will. The rotation of the drum in the direction for lowering the load or for lowering the hook Z is caused when the drum is disconnected from the shaft and its brake is not in action by the force of gravity, acting in the latter case mainly on the weight Y. This weight will also act as a stop to limit the hoist by coming in contact with the trolley-frame.

It will also be obvious that the operator working the hand-lever e can stop the grip-wheel D at will, which will result, through the medium of the rope H, in stopping the trolley at any desired point upon the I-beam. Whenever the brake mechanism of the grip-wheel is not in action the weight N serves to draw the trolley over to the end of the I-beam opposite the hoisting-drum. Thus by the operation of weights the trolley and hoisting-hook are always automatically brought to position for beginning work, and the operator has nothing to do but operate the levers S and e, so as to properly control the brakes, and ship the clutch mechanism in order to hoist and deliver a load at any point he chooses within the reach or field of the apparatus.

Now, to more fully explain the mode of operation, suppose that the respective weights Y and N have dropped and brought the hook Z down and the trolley back to the end of the I-beam farthest from the drum, and that the operator wishes to raise a load and convey it quickly forward. An attendant hooks the hook Z to it and the operator raises both hand-levers. The result is that the brake is applied to the grip-wheel, and the trolley is held firmly in place while the drum and shaft are connected and the load is hoisted. When the load is raised sufficiently, which is only the work of a moment, the hand-lever e is lowered and the grip-wheel brake released. The trolley is then instantly drawn toward the drum, with the load, by the further winding up of the rope F. As soon as the load reaches or nearly reaches the place of delivery the hand-lever S is lowered, which disconnects the drum from the shaft and applies the brake to the drum, thereby locking the load suspended. At the same time, or instantly after, the hand-lever e is raised, which applies the grip-wheel brake. The lever S is then slightly raised, and the load will then run down by its own gravity under control of the drum-brake. An attendant then detaches the hook from the load and the hand-lever e is lowered, when the weight N draws the trolley back to the place of starting, and the weight Y and hook Z drag back also, unwinding the rope F from the drum as they return for another load. The trolley can be stopped in returning at any point on its track, whenever the operator may desire it, by merely applying the grip-wheel brake; and it may also be stopped at any point in its advance movement, with or without its load, by the same means, the operator at the same time of course unclutching the drum and applying the drum-brake. The load may also be dropped gently, and in practice always is, when necessary, by applying the drum-brake properly as the load nears the limit of its descent.

Thus it will be seen that by my improved apparatus heavy materials can be swiftly hoisted and conveyed long distances and gently delivered by a single operator working the hand-levers and an attendant to do the hooking and unhooking at each end of the field. By this means bales of cotton and other heavy merchandise can be loaded and unloaded from ships or cars with great speed, safety, facility, and economy of labor.

The scope of my invention is not limited to the details of construction of the parts hereinbefore described. On the contrary, my invention comprehends the use of any suitable mechanism having the capacity of that described, and organized together for the objects set forth. Thus, for example, instead of having the rope L and weight N to withdraw the trolley after delivering a load, I may employ other equivalent mechanism operating either automatically, by hand, or by power for the purpose. The same is true of other features of my apparatus.

Having thus described my invention, what I claim as new, and desire to secure by Letters Patent of the United States, is—

1. The combination of a track, a trolley, an endless band passing over sheaves and connected with the trolley, a hoisting-drum and hoisting-rope connected with the trolley, and a weighted rope, L, or equivalent, connected with the trolley, substantially as set forth.

2. The combination of a track, a trolley, a rope, H, passing over suitable sheaves and connected with the trolley, a brake mechanism whereby the trolley can be stopped and held at will, and a weighted rope, L, or equivalent means, for returning the trolley, substantially as set forth.

3. The combination of a track, a trolley, a driving-shaft, a hoisting-drum and cable, clutch mechanism for connecting and disconnecting the drum and shaft, and brake mechanism for the drum, substantially as set forth.

4. The combination of a track, a trolley, a hoisting mechanism, a clutch mechanism, a brake for the hoisting mechanism, a mechanism for stopping and holding the trolley in any desired position on its track, and a means for moving the trolley back on its track away from the hoisting mechanism, substantially as set forth.

5. The combination of the hand-lever S, the link T, the lever P, with its shipper-arm, and the pivoted brake U, substantially as set forth.

6. The combination, with the track and the trolley, of the anti-friction steady-wheels, substantially as set forth.

7. The combination of a grip-wheel, a sheave, and an endless rope passing over the grip-wheel and sheave and connected to either side of a trolley, so that during the rotation of the grip-wheel the trolley may be pulled in either direction, as desired.

8. A trolley-controlling mechanism consisting of a grip-wheel, a rope passing around said wheel and attached to either side of a trolley, and means for holding said wheel stationary, so that the trolley cannot be moved in either direction, substantially as described.

9. The combination of a track, a trolley, a driving-shaft, a hoisting-drum and cable, and clutch mechanism for connecting and disconnecting the drum and shaft, substantially as described.

In testimony whereof I have hereunto subscribed my name this 10th day of January, A. D. 1883.

THOS. W. CAPEN.

Witnesses:
SCHUYLER MERRITT,
GEO. E. WHITE.